(12) United States Patent
Hamperl

(10) Patent No.: US 7,232,140 B2
(45) Date of Patent: Jun. 19, 2007

(54) STEERING KNUCKLE PIN BEARING

(75) Inventor: Johann Hamperl, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 524 days.

(21) Appl. No.: 10/866,646

(22) Filed: Jun. 12, 2004

(65) Prior Publication Data

US 2004/0262875 A1    Dec. 30, 2004

Related U.S. Application Data

(63) Continuation-in-part of application No. PCT/EP02/13069, filed on Nov. 21, 2002.

(30) Foreign Application Priority Data

Dec. 13, 2001   (DE)   ................ 101 61 207

(51) Int. Cl.
    *B62D 7/18*    (2006.01)
(52) U.S. Cl. ............ 280/93.512; 280/124.113
(58) Field of Classification Search ............ 180/252, 180/253; 280/93.512, 124.113
    See application file for complete search history.

(56) References Cited

U.S. PATENT DOCUMENTS

| | | | |
|---|---|---|---|
| 1,503,511 A | 8/1924 | Masury | |
| 1,865,202 A * | 6/1932 | Milligan | ................ 280/93.512 |
| 2,512,881 A * | 6/1950 | Smiley, Jr. | ................ 384/396 |
| 4,733,744 A * | 3/1988 | Glaze | ................ 180/256 |
| 5,340,137 A * | 8/1994 | Carraro et al. | ......... 280/93.512 |
| 5,413,365 A | 5/1995 | Bodin et al. | |
| 6,607,203 B2 * | 8/2003 | Bodin | ................ 280/93.512 |
| 2003/0075982 A1 * | 4/2003 | Seefeldt | ................ 307/29 |

FOREIGN PATENT DOCUMENTS

| | | |
|---|---|---|
| DE | 196 31 946 | 2/1998 |
| DE | 197 38 113 | 3/1999 |
| DE | 199 55 509 | 5/2001 |
| FR | 2 576 860 | 8/1986 |

* cited by examiner

*Primary Examiner*—Paul N. Dickson
*Assistant Examiner*—Tiffany L. Webb
(74) *Attorney, Agent, or Firm*—Klaus J. Bach

(57) ABSTRACT

In a wheel support structure of a commercial vehicle including an axle with a jaw structure having two bearing bores and a stub protruding into the jaw structure with a pin extending into the stub and into the bearing bores, the bearing bores are closed adjustably by screw caps threaded into the bearing bores for adjusting the pin position and setting a predetermined moment of friction between the bearing elements.

5 Claims, 2 Drawing Sheets

STEERING KNUCKLE PIN BEARING

This is a Continuation-In-Part Application of international application PCT/EP02/13069 filed Nov. 21, 2002 and claiming the priority of German application 101 61 207.9 filed Dec. 13, 2001.

BACKGROUND OF THE INVENTION

The invention relates to a steering knuckle pin bearing in an axle of a vehicle, in particular a commercial vehicle, for mounting a steerable vehicle wheel on a vehicle chassis.

DE 196 31 946 A1 discloses a steering knuckle pin bearing of this type which has a wheel-side first bearing element which is mounted pivotally on a chassis-side second bearing element. The wheel-side first bearing element has a jaw in which aligned first and second bearing bores are provided. The chassis-side second bearing element has a stub which protrudes into the jaw and receives therein a steering knuckle bearing pin whose axis extends between a first bearing journal and a second bearing journal. By this means, two bearing journals which are aligned with each other are formed on the stub. The first bearing journal is mounted in the first bearing bore via a first bearing while the second bearing journal is mounted in the second bearing bore via a second bearing. Furthermore, the first bearing bore is closed by a screw cap which interacts with a thread and by which the first bearing is axially engaged. For the purpose of installing the steering knuckle pin bearing, the screw cap can be adjusted by screwing on the thread to an extent such that, as a result, between the bearing elements a predetermined moment of friction can be set between the bearing elements. In contrast to this, the second bearing bore is closed by a positionally fixed cover, consequently the relative position between the bearing elements in the axial direction of the bearing journals is determined by the fixed cover and the second bearing supported thereon.

U.S. Pat. No. 5,413,365 discloses another steering knuckle pin bearing, in which the first bearing bore can likewise be closed by a screw cap, in which case screwing in of the screw cap enables an outer ring of a conical bearing to be clamped with a predetermined tightening torque against an axial shoulder formed in the bearing bore. This enables the setting of a certain axial pre-stress with which the outer ring comes to bear against the bearing shoulder. As a result, an adjustment of the moment of friction and an adjustment of the relative position between the bearing elements is not possible.

A further steering knuckle pin bearing is disclosed in U.S. Pat. No. 1,503,511, in which a conical steering knuckle bearing pin penetrates the stub in an opening of conical design complementary to it. The steering knuckle bearing pin can now be adjusted axially by means of a screw cap in order to axially clamp an outer side of the stub against an inner side of the opening for firm engagement of the bearing pin with the stub.

Further steering knuckle pin bearings are disclosed, for example, in DE 199 55 509 A1 and in DE 197 38 113 A1.

In a steering knuckle pin bearing, during the installation a predetermined relative position between the two bearing elements has to be set relatively precisely in order thereby to optimize the steering kinematics of the wheel mounting, in particular to enable the steering operation to be optimized as a result. It is also necessary to set a predetermined moment of friction between the bearing elements in order thereby to improve the characteristics of the vehicle-movement dynamics, in particular to avoid a "steering vibration". The setting of the relative position and of the moment of friction can according to FR 2 576 860 A be realized by a compensating washer or a compensating washer assembly disposed at a suitable point, e.g. axially on or in the associated bearing bore between one of the bearings and its axial support. The determination of the compensating washer which is best suited or of the compensating washer assembly which is best suited is relatively time-consuming. Furthermore, only a predetermined selection of compensating washers of different thickness is available, so that the setting of the desired relative position and of the desired moment of friction is possible only in predefined steps.

It is the object of the present invention to provide an improved steering knuckle pin bearing arrangement in which in particular the setting of the relative position and of the moment of friction between the bearing elements are simplified.

SUMMARY OF THE INVENTION

In a steering knuckle pin bearing of an axle of a vehicle, in particular a commercial vehicle, for mounting a vehicle wheel on a vehicle chassis, wherein a wheel-side bearing element is mounted pivotally on a chassis-side bearing element and one of the bearing elements has a jaw structure in which two bearing bores are formed while the other bearing element has a stub which protrudes into the jaw structure and on which two bearing journals are formed which are mounted in the bearing bores via bearings, the one bearing bore is closed by a screw cap which interacts with a thread and on which the bearing is supported axially, with the screw cap being adjustable to an extent such that a predetermined relative axial position can be set between the bearing elements and the other screw cap being adjustable for setting a predetermined moment of friction between the bearing elements.

The invention is based on the general concept of closing the two bearing bores in each case by means of a screw cap in such a way that, during installation, the screw caps can be adjusted in the axial direction of the bearing journals by screwing relative to the bearing bore. With the other bearing journal which is accommodated in the other bearing bore being axially adjustable, the position of the screw cap can be set between the bearing elements in the axial direction of the bearing journals in an infinitely variable and particularly simple manner. If the other bearing bore is closed axially and the bearing accommodated therein or the bearing journal accommodated therein is supported axially, rotation of the screw cap permits adjustment of the moment of friction between the bearing elements in an infinitely variable and particularly simple manner. The relative position and of the moment of friction between the bearing elements can therefore be adjusted with high accuracy and in a simple manner.

It is expedient to secure the one screw cap or both screw caps against rotation after they have been adjusted in order to secure the desired settings.

In principle, the bearing element including the bearing bores can be provided, at least in the region of one of its bearing bores, with an external thread onto which the associated screw cap can be screwed, the latter then having a corresponding internal thread. However, it is advantageous to provide the particular bearing bore with an internal thread, and the associated screw cap with a corresponding external thread. In this arrangement, the forces to be transmitted via the thread are reduced. In addition, this embodiment is more compact.

The invention will become more readily apparent from the following description of preferred embodiments thereof described below with reference to the accompanying drawings.

DESCRIPTION OF PREFERRED EMBODIMENTS

Figure 1:
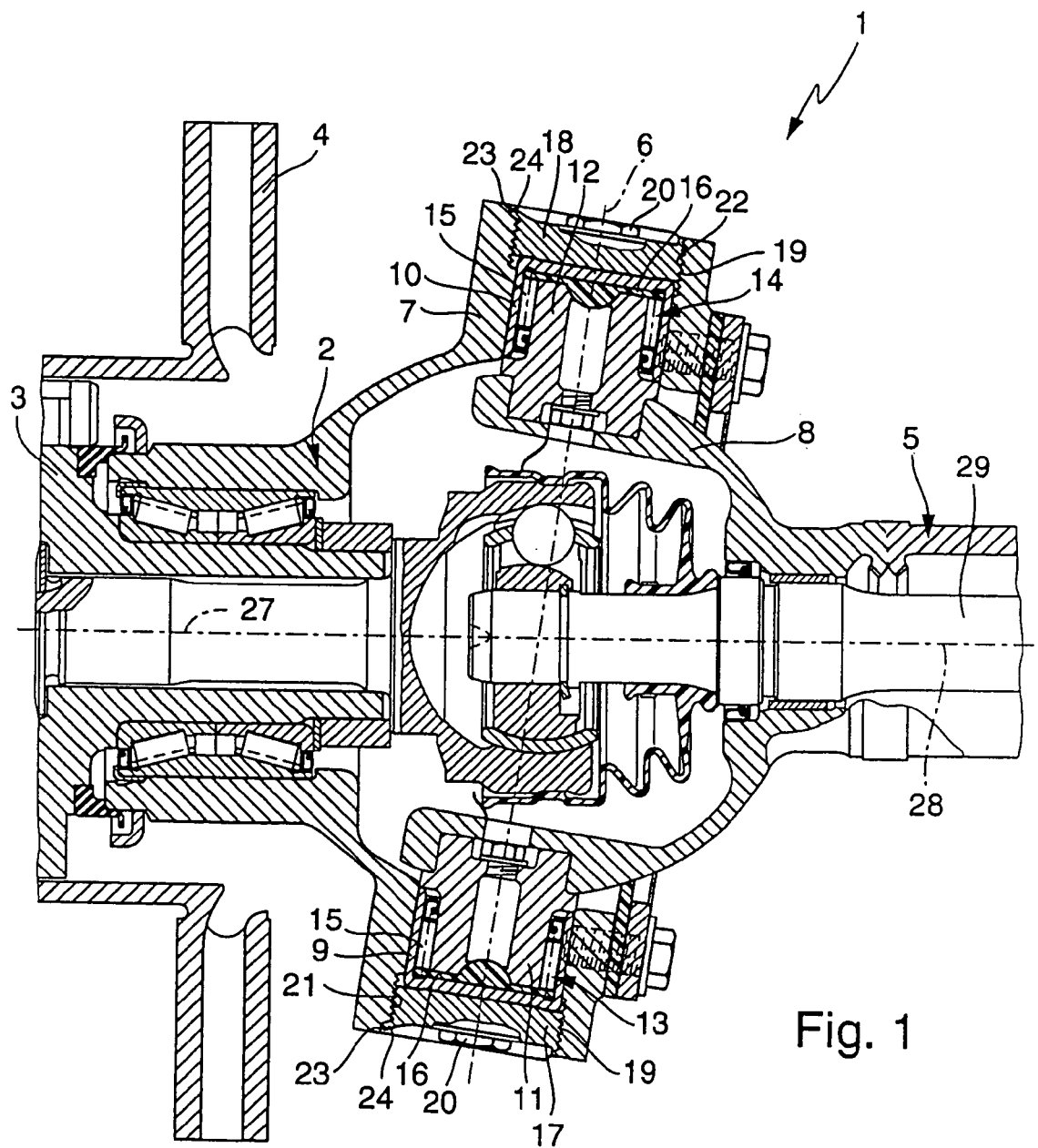
FIG. 1 shows in a longitudinal sectional view a steering knuckle pin bearing according to the invention for a driven axle.

Preferred exemplary embodiments of the invention are illustrated in the drawings and are explained in greater detail in the following description, using the same reference numerals when referring to identical or functionally identical or similar components.

Figure 2:
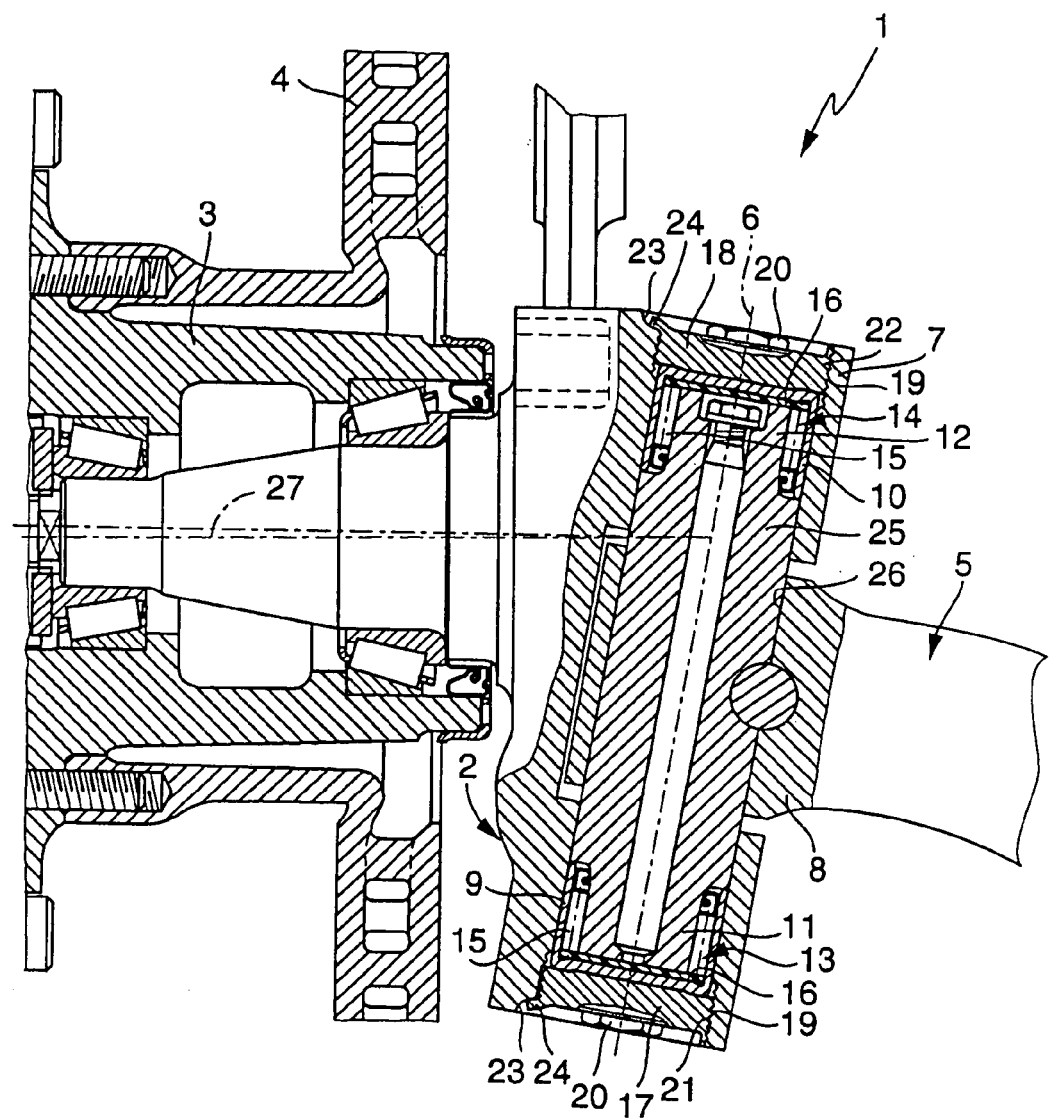
FIG. 2 shows in a view as in FIG. 1, a steering knuckle pin for a non-driven axle.

As shown in FIGS. 1 and 2, a steering knuckle pin bearing 1 according to the invention has a wheel-side first bearing element 2 which is connected to a hub 3 of a vehicle wheel (otherwise not shown). A disc brake of the wheel is designated by 4. This first bearing element 2 is mounted pivotably on a chassis-side second bearing element 5 which is fitted on a vehicle chassis (not shown here). The second bearing element 5 is usually a rigid axle body. A pivot axis about which the two bearing elements 2 and 5 are mounted pivotably on each other is designated by 6.

In the embodiments shown here, the first bearing element 2, i.e. the wheel-side bearing element 2, has a jaw 7 while the second bearing element 5, i.e. the chassis-side bearing element 5, has a stub 8. It is clear that, in principle, also the chassis-side second bearing element 5 may be equipped with a jaw, so that the stub is then formed on the wheel-side first bearing element 2.

The jaw 7 has a first bearing bore 9 (illustrated at the bottom in FIGS. 1 and 2) and a second bearing bore 10 (illustrated at the top in FIGS. 1 and 2). The two bearing bores 9 and 10 are positioned on the jaw 7 in such a manner that they are aligned with each other and are arranged co-axially with the pivot axis 6. The stub 8 protrudes into the jaw 7 and has a first bearing journal 11 (illustrated at the bottom in the figures) and a second bearing journal 12 (illustrated at the top in the figures). The bearing journals 11 and 12 are also arranged on the stub 8 in such a manner that they are aligned with each other and are orientated co-axially with the pivot axis 6. The first bearing journal 11 is inserted into a cup-shaped first bearing 13 and is mounted via the latter in the first bearing bore 9. In a corresponding manner, the second bearing journal 12 is also inserted into a cup-shaped second bearing 14 and is mounted via the latter in the second bearing bore 10. The bearings 13 and 14 each contain a radial bearing 15, for example in the form of a needle bearing, and an axial bearing 16, for example in the form of a friction bearing. The bearings 13, 14 are expediently fitted in a hermetically sealed manner on the bearing journals 11, 12, so that the bearings 13 and 14 can expediently be designed to be free from maintenance. The two bearings 13 and 14 are designed here as bearing bushings which are closed on one side.

The first bearing bore 9 is closed in the axial direction by a first screw cap 17. In a corresponding manner, the second bearing bore 10 is also closed in the axial direction by a second screw cap 18. In this case, the first screw cap 17 closes the first bearing bore 9 on an outer side which faces away from the stub 8. In a corresponding manner, the second screw cap 18 also closes the second bearing bore 10 on an outer side which faces away from the stub 8.

The screw caps 17 and 18 each have an external thread 19 and are equipped axially on the outside with a polygonal stub 20. For the first screw cap 17, a first internal thread 21 is provided on the jaw 7 is cut into the first bearing bore 9. Also for the second screw cap 18, a second internal thread 22 is provided in a corresponding manner in the jaw 7 and is likewise cut into the second bearing bore 10. The respective bearings 13 and 14 are supported in the axial direction on these screw caps 17 and 18.

The bearing bores 9 and 10, have at on their axially outer edges, at least one cutout or notch 23 into which an edge section of the particular screw cap 17, 18 protrudes, forming a drive-in lug 24. As a result, this drive-in lug 24 is in form-fitting engagement with the particular notch 23 in screwing direction of the particular screw cap 17, 18, for securing the screw cap 17, 18 against rotation.

The threads 21 and 22 and the screw caps 17 and 18 are coordinated with one another and dimensioned with respect to the axial direction of the bearing pins 11, 12 in such a manner that an adjustment region is formed for both screw caps 17, 18, in which the screw caps 17, 18 can be adjusted in the axial direction of the bearing journals 11, 12 at least during the installation of the steering knuckle pin bearing 1. The axes of the bearing journals 11 and 12 coincide with the pivot axis 6. Therefore the axes of the bearing journals 11, 12 are both designated by the reference numeral 6.

In the embodiment according to FIG. 1, the steering knuckle pin bearing 1 is designed for a driven axle or for a driven wheel. In this embodiment, the bearing journals 11 and 12 are separate components which are fastened on the stub 8 of the second bearing element 5, for example by means of press fitting. In contrast, the steering knuckle pin bearing 1 in FIG. 2 is a variant for a non-driven axle or for a non-driven vehicle wheel. In this case, the two bearing journals 11 and 12 are formed on a steering knuckle bearing pin 25 which is inserted into an opening 26 in the stub 8. As a result, the stub 8 extends around, and firmly engages, the steering knuckle bearing pin 25 between the bearing journals 11 and 12. The steering knuckle bearing pin 25 can be fastened on the stub 8 likewise by means of a press fit and/or by a form-fitting connection.

The steering knuckle pin bearing 1 according to the invention can be fitted as follows:

The two bearing bores 9 and 10 are initially open. Then, in a customary manner, the stub 8 can be inserted into the jaw 7 and the bearing journals 11 and 12 together with the bearing bushings 13 and 14 can be inserted into the bearing bores 9 and 10.

When the bearing journals 11, 12 are inserted, it is possible, for example in the embodiment according to FIG. 2, for one of the bearing bores 9, 10 to already be closed by the associated screw cap 17, 18. However, the bearing bore 9, 10 is expediently closed only after the bearing journals 11, 12 have been properly adjusted.

After the bearing journals 11, 12 are inserted into their bearing bores 9, 10, the relative position of the two bearing elements 2 and 5 is adjusted. In this adjustment operation, one of the bearing bores 9, 10, expediently the lower, first bearing bore 9, is first closed by the first screw cap 17.

Adjustment of the first screw cap 17 by screwing provides the position adjustment of the first screw cap 17 relative to the first bearing bore 9 in the axial direction 6 of the bearing journals 11, 12. As a result, since the second bearing element 5 is supported on the first screw cap 17 via the first bearing journal 11 and the first bearing 13, the relative axial position of the second bearing element 5 and the first bearing element 2 is also adjusted. In the embodiment according to FIG. 1, the desired relative position corresponds to a position in which a hub axis 27 of the vehicle wheel is aligned with a central axis 28 of a drive shaft 29. In the embodiment according to FIG. 2, the desired relative position is defined by other predetermined parameters; in particular, the hub axes 27 on the opposite sides of the vehicle should be aligned with each other.

After determining the desired relative position between the two bearing elements 2 and 5, the first screw cap 17 can already be rotationally secured, for example by the drive-in lug 24 being driven into the notch 23. As an alternative, or in addition, the first screw cap 17 may also be cemented or soldered in position.

During this adjustment phase for discovering the correct relative position, the second screw cap 18 may already (partially) be screwed into the second thread 22, in which case, however, care should be taken to ensure that there is no axial contact between the second bearing 14 and the second screw cap 18.

In a subsequent installation phase, the desired moment of friction, which is to prevail during pivoting movements about the pivot axis 6, between the bearing elements 2 and 5 can now be set. For this purpose, the second screw cap 18 is now inserted, if appropriate, and adjusted by rotating until there is a clamping action which produces the desired moment of friction. When the predetermined moment of friction has been found, the second screw cap 18 may also be secured in a corresponding manner against rotation.

In the case of the steering knuckle pin bearing 1 according to the invention, the settings and adjustments can be carried out with a conventional tool, without particular difficulty, in an infinitely variable and, as a result, very precise manner with little time being required. In comparison to conventional steering knuckle pin bearings which have to be set using compensating washers or compensating washer assemblies, the advantages of the steering knuckle pin bearing 1 according to the invention with regard to its fitting capability are obvious.

By appropriate dimensioning of the threads 21, 22, the setting regions of the screw caps 17, 18 are matched to the manufacturing tolerances or chain of manufacturing tolerances in order to always be able to implement the desired settings.

What is claimed is:

1. A steering knuckle pin bearing in an axle of a vehicle, particularly a commercial vehicle, for supporting a steerable vehicle wheel on a vehicle chassis, comprising:
   a wheel-side first bearing element (2) mounted pivotably on a chassis-side second bearing element (5),
   one of the bearing elements (2) having a jaw (7) including a first bearing bore (9) provided with a first internal thread (21) and a second bearing bore (10) provided with a second internal thread (22), both bearing bores (9, 10) being in alignment with each other,
   the second bearing element (5) having a stub (8) which protrudes into the jaw (7), said jaw including a first bearing journal (11) and a second bearing journal (12) which are aligned with each other,
   said first bearing journal (11) being mounted in said first bearing bore (9) via a first bearing (13), and
   said second bearing journal (12) being mounted in said second bearing bore (10) via a second bearing (14),
   said first bearing bore (9) being closed by a first screw cap (17) which interacts with the first thread (21) and on which the first bearing (13) is supported axially,
   said second bearing bore (10) being closed by a second screw cap (18) which interacts with the second thread (22) and on which the second bearing (14) is supported axially, and
   both screw caps (17, 18) being adjustable to an extent such that, as a result, in the axial direction of the bearing journals (11, 12), a predetermined relative position can be set between the bearing elements (2, 5) by adjustment of said first screw cap (17), and a predetermined moment of friction can be set between the bearing elements (2, 5) by adjustment of said second screw cap (18).

2. A steering knuckle pin bearing according to claim 1, wherein at least one of said screw caps (17, 18) is secured against rotation after being installed.

3. A steering knuckle pin bearing according to claim 1, wherein at least one of the bearing journals (11, 12) is a separate component which is fastened to the stub (8).

4. A steering knuckle pin bearing according to claim 1, wherein the bearing journals (11, 12) are formed on a steering knuckle bearing pin (25), the stub (8) extending around, and firmly engaging, the steering knuckle bearing pin (25) between the bearing journals (11, 12).

5. A method for installing a steering knuckle pin bearing (1), in an axle of a vehicle, particularly a commercial vehicle, for supporting a steerable vehicle wheel on a vehicle chassis, comprising:
   a wheel-side first bearing element (2) mounted pivotably on a chassis-side second bearing element (5),
   one of the bearing elements (2) having a jaw (7) including a first bearing bore (9) provided with a first internal thread (21) and a second bearing bore (10) provided with a second internal thread (22), both bearing bores (9, 10) being in alignment with each other,
   the second bearing element (5) having a stub (8) which protrudes into the jaw (7), said jaw including a first bearing journal (11) and a second bearing journal (12) which are aligned with each other,
   said first bearing journal (11) being mounted in said first bearing bore (9) via a first bearing (13), and
   said second bearing journal (12) being mounted in said second bearing bore (10) via a second bearing (14),
   said first bearing bore (9) being closed by a first adjustable screw cap (17) which interacts with the first thread (21) and on which the first bearing (13) is supported axially, and
   said second bearing bore (10) being closed by a second adjustable screw cap (18) which interacts with the second thread (22) and on which the second bearing (14) is supported axially,
   said method comprising the steps of placing the stub (8) into the jaw (7) and the bearing journals (11, 12) and the bearings (13, 14) into the bearing bores (9, 10), threading the first screw cap (17) into the first internal thread until the two bearing elements (2, 5) are in their predetermined relative position to each other, and after the relative position is set, screwing the second screw cap (18) into the second internal thread and adjusting it by screwing until the predetermined moment of friction is provided between the two bearing elements (2, 5).

* * * * *